United States Patent [19]

Valentino

[11] Patent Number: 5,103,742
[45] Date of Patent: Apr. 14, 1992

[54] HIGH-TECH COMPUTERIZED OFF-GAS COMBUSTION TREATMENT AND APPARATUS

[76] Inventor: Joseph V. Valentino, 858 Xon Wood Park Dr., White Plains, N.Y. 10605

[21] Appl. No.: 651,656

[22] Filed: Feb. 6, 1991

[51] Int. Cl.$^5$ .......................................... F23J 15/00
[52] U.S. Cl. ........................ 110/215; 110/185; 110/345; 422/111; 422/168; 55/18
[58] Field of Search ............... 110/215, 345, 185; 55/18, 225, 227; 422/111, 168

[56] References Cited

U.S. PATENT DOCUMENTS

| | | | |
|---|---|---|---|
| 4,223,614 | 9/1980 | Barrhuus et al. | 110/215 X |
| 4,670,221 | 6/1987 | Marnet et al. | 422/168 X |
| 4,909,160 | 3/1990 | Frick et al. | 110/185 |

*Primary Examiner*—Edward G. Favors

[57] ABSTRACT

An exhaust system adapted for the selective control of the types and concentrations of emissions to the atmosphere in the off-gas of a combustion unit, the system including at least one chemical treatment chamber, at least one off-gas, kinetic energy reducing chamber communicating with at least one chemical treatment chamber and adapted to provide a reduced pressure off-gas region wherein the kinetic energy of the off-gas from the treatment chamber is diminished, at least one chemical reactor communicating with at least one treatment chamber and adapted to provide reactant chemicals in contact with the off-gas in the treatment chamber, at least one reactant chemical selecting system associated with at least one chemical reactor and adapted for presenting different chemicals and concentrations thereof to the off-gas in at least one treatment chamber, cooling apparatus for the off-gas in one or more selected portions of the exhaust system, and a control system communicating with the off-gas at one or more locations within the exhaust system for qualitatively and quantitatively analyzing the off-gas and actuating the selecting system in relationship to the gas analysis to provide selected reactant chemicals in predetermined quantities to at least one chemical reactor for contact with the off-gas to selectively control the types and concentrations of matter therein.

21 Claims, 4 Drawing Sheets

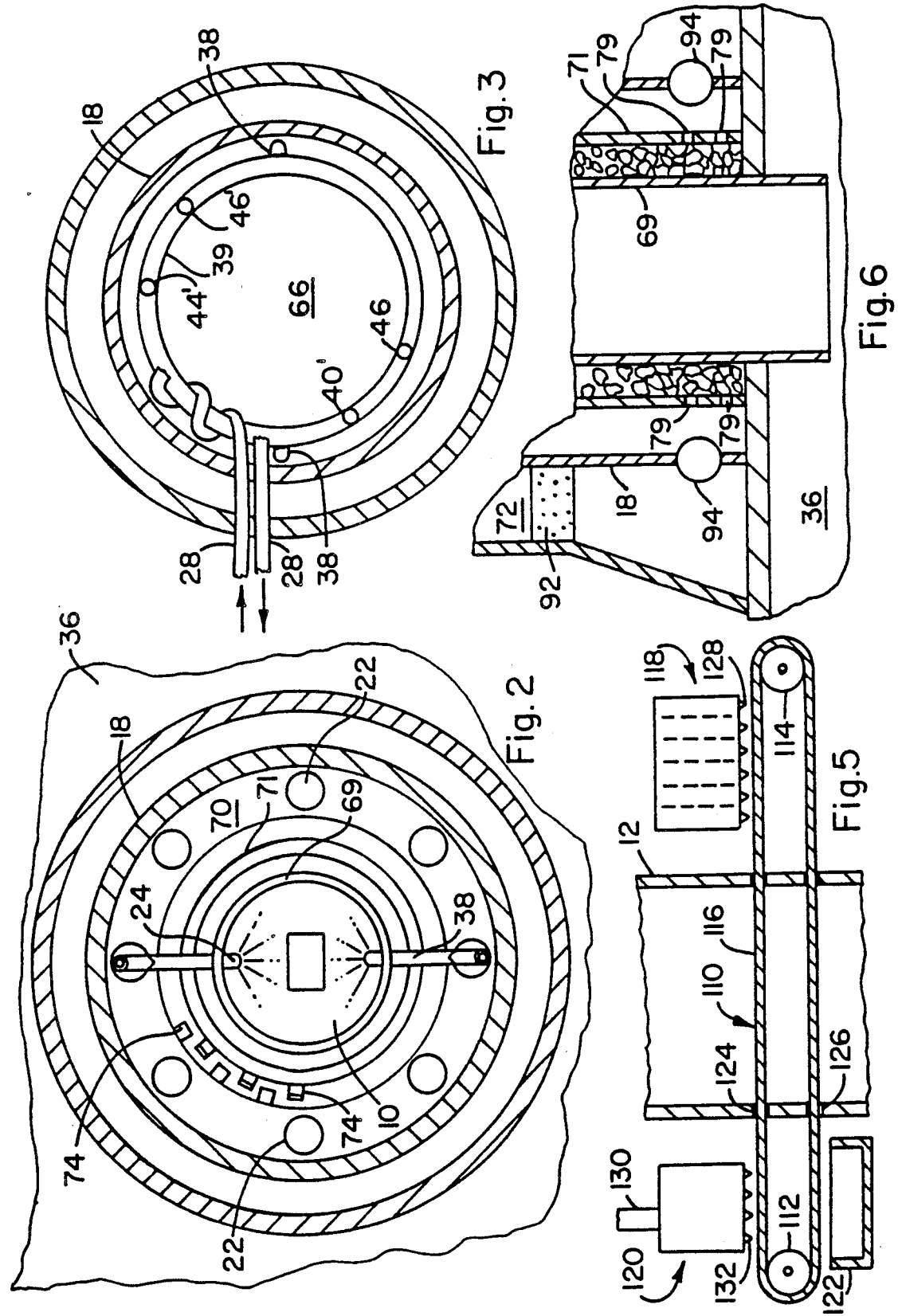

HIGH-TECH COMPUTERIZED OFF-GAS COMBUSTION TREATMENT AND APPARATUS

FIELD OF INVENTION

This invention concerns method and apparatus for the handling of combustion off-gas or flue gas, and particularly concerns such method and apparatus which are readily adapted to existing incineration, heating or power installations, and which effect improved control of the types and amounts of gaseous, ionic, colloidal or sizeable particulate off-gas constituents such as fly ash which are ultimately vented to the atmosphere. Also, the method and apparatus are uniquely adapted to employ the kinetic energy of the off gas and steam-developed back pressure to generate power through turbine equipment or the like.

BACKGROUND OF INVENTION AND PRIOR ART

The air pollution problems associated with such combustion by-products as, for example, the various oxides of nitrogen, sulfur, carbon, phosphorus, mercury and other metals, the various halides such as HCl and HBr, the phosphoryl compounds, the many other volatile metal halides, oxides and complexes, the various sulfur containing compounds such as hydrogen sulfide or carbon disulfide, and the organic toxic pollutants such as dioxin and the like which are strongly adsorbed on fly ash, are well recognized and of course, are the subject of enormous international research and development effort. Such by-products typically are produced through garbage or trash incineration, or building heating, power production or the like from fossil or other fuels.

Industry has responded to these problems with many pollution control devices and processes such as off-gas scrubbing, filtering, electrical precipitation, electric arc afterburning, catalytic burning, baffled flues and chimneys, and the like, many of which are of limited practical valve, particularly for the effective removal of fly ash and other particulate fines, and practically all of which require large and expensive special auxilliary off-gas handling equipment and housing structures therefor. Ofttimes these control devices are not adaptable to existing flue equipment and the cooperating or supporting equipment or installations comprises several buildings or at least several interconnected but separate installations of scrubbers, cyclone separators, filter equipment, economizers, and the like, which necessarily complicate the off-gas treatment aspect, both labor and apparatus, particularly maintenance, and leads to unmanageable cost of off-gas clean up. Typical such prior installations are depicted and discussed in the Allen Hershkowitz article in *Technology Review*, July 30, 1987, and in U.S. Pat. Nos. 3,710,555; 3,706,182; 3,695,004; 3,984,220; 4,095,514; 4,286,973; 4,206,722; 4,635,569; and 3,442,232, the disclosures of all of which are incorporated herein by reference, particularly the relevant structures thereof, e.g., the spray or jet nozzles.

Objects of the present invention therefore, are:

(1) to provide an off-gas treatment process and apparatus therefor which is useable as original equipment or readily adaptable to existing flue structures at minimum reconstruction effort and cost, and which is highly effective in reducing the levels of undesirable air pollutants, especially particulate fines;

(2) to provide such process and apparatus which is provided with scrubbing means adaptable to automatic, electronic control;

(3) to provide such process and apparatus with continous or semi-continuous off-gas monitoring analysis, computer interpretation of the analysis data and computer regulation of chemical reactor means within the flue system for reacting out normally pollutant chemicals in response to said computer interpretation; and (4) to provide such method and process which is energy efficient and capable of effectively generating power, particularly electric power.

SUMMARY OF THE INVENTION

These and other objects hereinafter becoming evident have been attained in accordance with the present invention which, in its process embodiment is defined as the process for selectively controlling the concentration of one or more constituents in the off-gas of a combustion unit having a fire box and a flue system, comprising carrying out the following activities, in any order, in a continuous or semi-continuous manner;

(a) analyzing the chemical composition of the off-gas at one or more locations in said flue system;

(b) directing the off-gas from the fire box into chemical treatment chamber means maintained at predesigned off-gas pressures;

(c) contacting the off-gas in said treatment chamber means with reactant chemical means previously adjusted in reactivity and specificity according to the chemical analysis of the off-gas, for converting prescribed amounts of one or more of the constituents of said off-gas to one or more desired products;

(d) exiting the treated off-gas from said treatment chamber means to second chamber means maintained at predesigned off-gas pressures lower than the off-gas pressures maintained in said treatment chamber means to effect a reduction in the kinetic energy of the treated off-gas and thus facilitate removal of particulate matter therefrom; and (e) exiting the reduced kinetic energy off-gas from said second chamber means to the atmosphere or other desired medium or apparatus.

In certain preferred process embodiments:

(1) the reduced kinetic energy off-gas is passed through filtering means for removing particulate matter therefrom prior to exiting to the atmosphere;

(2) said off-gas in said second chamber means is scrubbed with aqueous material to separate particulate matter therefrom;

(3) the temperature and kinetic energy of the off-gas in the treatment chamber means is further reduced by contact of the off-gas with heat exchanger cooling means;

(4) said reactant chemical means comprises aqueous material containing at least one reactant chemical and is injected as a spray into said off-gas; and (5) the off-gas and steam from the second chamber means is directed to power generating apparatus.

The apparatus embodiments of the invention is defined as an exhaust system adapted for the selective control of the types and concentrations of gaseous, ionic, collodial or particulate matter emitted to the atmosphere in the off-gas of a combustion unit, said system comprising:

(a) chemical treatment chamber means defined by
(i) first wall means,
(ii) off-gas inlet means in said first wall means, and (iii) outlet means in said first wall means providing an exit for chemically treated off-gas from said treatment chamber means;

(b) second wall means defining off-gas, second chamber means communicating with said outlet means of said treatment chamber means and adapted to provide a reduced pressure off-gas region;

(c) exhaust port means in said second wall means for exiting reduced kinetic energy off-gas;

(d) reactor means communicating with said treatment chamber means and adapted to provide reactant chemicals in contact with the off-gas in said treatment chamber means;

(e) reactant chemical selecting means associated with said reactor means and adapted for presenting different chemicals and concentrations thereof to said off-gas in said treatment chamber means;

(f) cooling means for the off-gas in one or more selected portions of said exhaust system; and (g) control means communicating with the off-gas at one or more locations within said exhaust system for qualitatively and quantitatively analyzing the same and actuating said selecting means in relationship to said analysis to provide selected reactant chemicals in predetermined quantities to said reactor means for contact with said off-gas to selectively control the types and concentrations of said matter therein.

In certain preferred apparatus embodiments:

(1) third wall means provides exhaust stack means communicating with said exhaust port means of said second chamber means;

(2) said first, second and third wall means are interconnected;

(3) said treatment chamber means is elongated and adapted for positioning above and in communication with the fire box of a combustion unit with its longitudinal axis oriented substantially vertically;

(4) said control means provides substantially continuous off-gas analysis and reactant chemical selection;

(5) said reactor means comprises multiple fluid streams of different chemical compositions;

(6) cooling means is provided for maintaining said second chamber means at a reduced temperature;

(7) said second chamber means is positioned substantially vertically above said treatment chamber means;

(8) common cooling means is provided for said reactor means and second chamber means; and (9) said common cooling means comprises heat exchanger means within said second chamber means or proximate thereto.

The invention will be further understood from the following description and drawings wherein:

FIG. 2 is a cross-sectional view taken along line 2—2 of FIG. 1 in the direction of the arrows;

FIG. 3 is a cross-sectional view taken along line 3—3 of FIG. 1 in the direction of the arrows;

FIG. 5 is a transverse, cross-sectional view of the chemical treatment section of the exhaust system of FIG. 4 showing a variation of the chemical reactor means;

FIG. 6 is a varation of the power generating area of the system; and

BRIEF DESCRIPTION OF THE INVENTION

Figure 1:
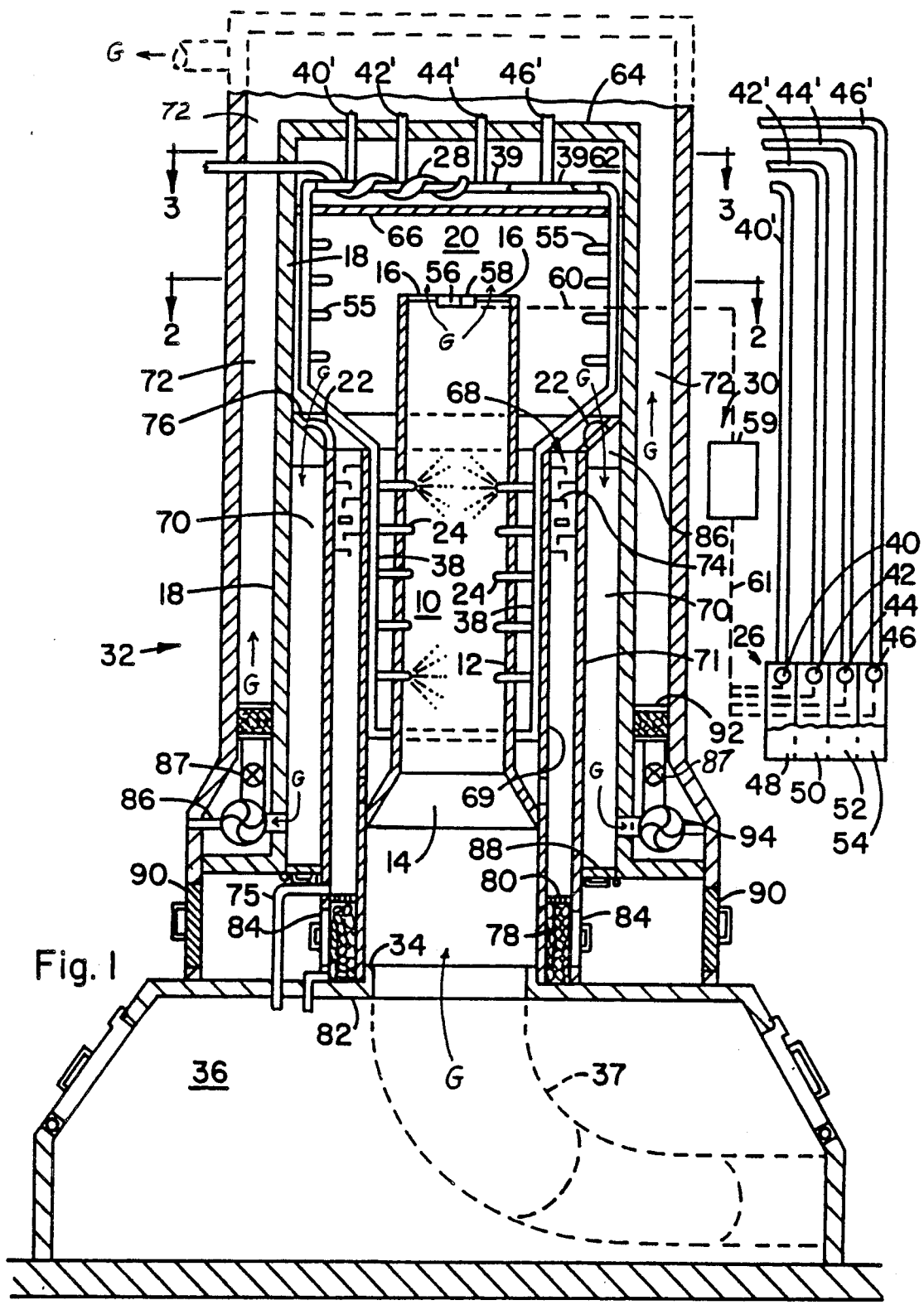
FIG. 1 is a longitudinal sectional view of an off-gas exhaust system embodying the present invention as installed directly onto the off-gas outlet of a fire-box.

A brief description of the present invention, with reference to the drawings and claims hereof comprises:

(a) chemical treatment chamber means 10 defined by
(i) first wall means 12,
(ii) off-gas inlet means 14 in said first wall means, and
(iii) outlet means 16 in said first wall means providing an exit for chemically treated off-gas from said treatment chamber means;

(b) second wall means 18 defining off-gas second chamber means 20 communicating with said outlet means 16 of said treatment chamber means and adapted to provide a reduced pressure off-gas region;

(c) exhaust port means 22 in said second wall means for exiting reducing kinetic energy off-gas;

(d) reactor means 24 communicating with said treatment chamber means and adapted to provide reactant chemicals in contact with the off-gas in said treatment chamber means;

(e) reactant chemical selecting means 26 associated with said reactor means and adapted for presenting different chemicals and concentrations thereof to said off-gas in said treatment chamber means;

(f) cooling means 28 for the off-gas in one or more selected portions of said exhaust system; and (g) control means 30 communicating with the off-gas at one or more locations within said exhaust system for qualitatively and quantitatively analyzing the same and actuating said selecting means in relationship to said analysis to provide selected reactant chemicals in predetermined quantities to said reactor means for contact with said off-gas to selectively control the types and concentrations of said matter therein.

It is seen from the above description and gas flow path arrows in FIG. 1, that outlet means 16 from the chemical treatment or initial scrubbing section of the exhaust system presents a gas flow exit across which a pressure drop occurs, either as the result of the exit being restricted, or of cooling of the second chamber, or both, and effects gas expansion and/or a cooling, and reduction in kinetic energy of the off-gas. This diminishment of molecular and ash particle activity enhances the separability of pollutant materials from the off-gas and controls back pressure on the overall exhaust system which, if excessive, would reduce its capacity and efficiency.

DETAILED DESCRIPTION

Referring further to the drawings, the exhaust system is shown as a concentrically multicylindered, columnar stack generally designated 32 fitted over the outlet neck 34 of a combustion chamber or firebox 36, the stack preferably being oriented in practise essentially vertically. Such a stack is readily assemblable, without significant alteration of existing auxillary or supporting structure, onto many fireboxes presently in use in incinerator or power installations, in that it is substantially self contained and handleable as a single unit. In this regard, the stack 32 can be dimensioned in cross-section and length to accommodate existing equipment in virtually any installation. It is noted that the present exhaust system does not have to be affixed directly to a firebox outlet, but is insertable into the existing flue works of an incineration system at any desired location. In this regard, 36 as shown may be a clean-out or utlility chamber and the off-gasses may be received through a flue 37 connected to a combustion chamber at a location removed or remote from chamber 36.

The reactor means 24 is shown as a series of fluid jets of any convenient number mounted in wall 12 in any desired locations and connected by suitable piping or conduit 38 to chemical selecting means 26 which is provided with suitable valving such as solenoid flow-control valves 40, 42, 44 and 46 communicating respectively with the chemical feed reservoirs 48, 50, 52 and 54 which are typically pressurized in some manner to effect the proper flow of the chemical reactants. Any number of solenoid or equivalent valving can be employed in conjunction with any number of chemical reservoirs. Also, more complex flow-control valving may be employed to premix the various chemicals, if such is desired, according to what reactions are required to control off-gas pollutants.

In the embodiment shown, the jet feed conduit 38 is positioned on opposite sides of wall 12 in chamber 10 and is continuous at the bottom by half encircling wall 12. Several such feed conduits may be positioned around the reaction chamber. Conduit 38 extends upwardly and is connected into a mixing ring 39 to which the four chemical feed conduits 40, 42, 44 and 46 are fluid connected. It is noted that in a preferred embodiment of the invention, the various chemicals received from the aforesaid reservoirs are cooled in chamber 62 and intimately mixed within ring 39 prior to descending to the reactor jets. As a supplement to the jets in chamber 10, additional jets 55 may be provided on conduit 38 within the expansion chamber to further facilitate any necessary reactions. These additional jets, may however, be connected to another piping system, preferably cooled, to deliver scrubbing water rather than chemical reactants.

The control means generally designated 30 comprises one or more gas-analyzer probes or samplers such as 56 strategically placed within the exhaust system, preferably at the inlet to the reaction chamber 10, within the second chamber 20, and in the final exhaust chimney 72, and off-gas analysis means 58 which is electronically associated with computer means 59 through electrical conduit 60, computer means 59 being provided with programmable capability for interpreting the off-gas analysis data with respect to the chemical feeds necessary for converting the primal off-gas constituents to the types and levels desired or tolerable in atmospheric emissions. The output signals of the control means 30 are transmitted, e.g., through electrical conduit 61 to the flow-control solenoid valves of the chemical selecting means 26 to adjust the type and amount of reactant chemical feed to the ejectors or other reactor means.

The reactant chemical compositions which may be employed in practising the present invention are practically unlimited in variety, and a large number are well known and utilized for the control of elemental and the various compounds of mercury, lead, cadmium, sulfur, nitrogen, halogen, carbon, phosphorus and the like, as well as larger organic molecules such as dioxin, aldehydes, ketones, noxious sulfur containing organic molecules such as mercaptans, and the like. Examples of such chemical reactants are given in U.S. Pat. Nos. 3,728,433; 3,728,441; 3,728,440; and in T909,017, the disclosures of all of which are incorporated herein by reference.

The various useful reactant chemicals typically employed in off-gas scrubbing operations include water per se, aqueous slurries of $CaCO_3$, $CaO$, $NH_3$, and other such basic materials including NaOH and KOH, metal chelators such as ethylenediametetraacetic acid, ferrous iron compounds, cyanuric acid, yellow phosphorus aqueous emulsion, alkylamines, sulfamic acid, $KMnO_4$, $HNO_3$, and aqueous hypochlorite. The particular chemical employed, i.e., selected in accordance with the present invention in response to the analysis data from control means 30, will be determined by the off-gas composition at the analysis sampling sites in the exhaust system and the desired or targeted emission composition to the atmosphere.

The type of off-gas analysis device useful in the present invention may, of course, be widely varied, and dependent to some degree on the principal types of combustible material to be fed to the firebox or combustion chamber. Typical useful gas sampling and analysis systems, both quantitative and qualitative, are disclosed in: the sales brochures of Enmet Corporation, Ann Arbor, Mich., and in the sales brochures of Gastech Corporation, Newark, Calif.; and in the Product Line Catalog of THERMO ENVIRONMENTAL INSTRUMENTS INC., Franklin, Mass., pages 1–45, especially pages 27–31 wherein is shown and described a Flue Gas Analyzer System particularly adapted for use in the present invention. Various computerized systems for recording and interpreting the analytical data, and for actuating the valving means for pumping the required chemical solutions or slurries to the injector nozzles are known to the art of computers and related servosystems.

The cooling means is shown as the conduit 28 which is connected to a fluid coolant source such as the cooling coils of a refrigeration unit, or a circulating cooling water source. The coolant fluid is preferably maintained below about 40 F. Conduit 28 is coiled around mixing ring 39 which is preferably mounted in a coolant chamber 62 formed by the upper side wall portion of wall 18, top 64 thereof, and floor 66. Any number of such rings 39 and cooling coils may be employed. Also, ring 39 may be in the form of a grid such that each chemical feed will travel a tortuous path for more intimate reactant mixing and enhanced cooling thereof. Alternatively or supplemental to conduit 28, this chamber 62 may be hermetically sealed and provided, in a continuing manner, with liquid coolant, such as the expanding or expanded refrigerant gas of a refrigeration unit, chilled water, or the like, through suitable fluid conduit means.

The capacity of the cooling means 28 and any supplemental system, in concert with the degree of expansion of the off-gas across exit 16, if such restricted exit is employed, should be such that the ratio of the average gas pressures in chamber 20 to the average gas pressure in chamber 10 preferably is between about 0.95 to about 0.75, and most preferably from about 0.9 to about 0.8, although any pressure drop in chamber 20 will effect some salutary diminution in the escape propensity of particulate material such as to enhance its capture by, e.g., aqueous scrubbing. The pressure in chamber 20 is a function of chamber coolant temperature, the mass and kinetic energy of incoming gasses, steam condensation rate, exhaust system temperature, and the like parameters. In preferred embodiments, such parameters are monitored by suitable measuring devices, i.e., thermostats, humidistats, or the like, and regulated to maintain adequate pressure in chamber 20 to operate power generating equipment such as gas turbine, electrical generators 94. Such parameter monitoring devices can be placed anywhere in the exhaust system and associated with a computer network such that, e.g., the temperature of the reactant materials and or the coolant in chamber 62, or even the rate at which combustibles are fed to the firebox, can be automatically regulated to maintain adequate pressure of the turbine gas feed. Where the cooling means utilizes the cooling fluid of a refrigeration unit, the reactant chemical feed conduits may be positioned adjacent thereto for convenient cooling of the chemical feeds. Such chemical cooling, preferably below about 40 F, reduces the kinetic energy of the off-gas in chamber 10 and assists in stabilizing desired reaction products formed therein.

In order to maximize the removal of pollutant fly ash and other particulate matter, structure is provided to cause the chemically treated, scrubbed and expanded off-gas and resultant slurry and condensation to follow a baffled path for further particle size reduction and filtering. This structure comprises grid channel 68, downcomers 70, and exhaust chimney 72 formed by wall means 69, 71 and 18. Channel 68 preferably is provided along its entire length and circumference with stainless steel baffle projections 74 of such shape as to break fly ash particles within the aqueous slurry into smaller pieces for easy transport through disposal conduit means such as shown as 75. This channel, containing cooled slurry, will act as a thermal barrier to the initial off-gas heat in chamber 10. In order to direct the slurry into this channel, an angled splash plate 76 is provided encircling the channel perimeter. The lower end of channel 68 may be provided with a chemical treatment section 78 filled with limestone chunks, or other chemically reactive material, to convert the slurry passing through grid separators 80 to, for example, a neutral pH aqueous system. Suitable drain lines such as 82 and clean-out access doors 84 may be provided for this section.

The gaseous material from second chamber 20 may be further treated in downcomers 70. Each port means 22 may be provided with a cap or grid of any shape and structure to minimize the flow of slurry therethrough into the downcomers. Filtering means of any composition and construction, including granular material, may be provided in the downcomers which are provided with access doors such as 88. The filter means may be of elongated, self-supporting material such as stainless steel wool type, in the form of a cartridge for easy insertion up into the downcomers and for easy removal therefrom when depleted or fully contaminated. Access doors 90 provide each access to doors 88 and the downcomers. An upper portion of the downcomers may be provided with a permanent or long life matrix such as ceramic coated, stainless steel wire mesh or the like.

The chimney portion of the exhaust system is preferably provided with filtering means 92 of any desired type, shape and size. Also, any number and capacity of exhaust fans such as 94 may be provided to over come undesirable back pressure. As mentioned above, that 94 also may represent power generating turbines or the like which can be used to generate electricity by flow of the off-gas and steam down through the downcomers. Various generating auxilliary structures such as valved, power generating gas exhaust line 86, and off-gas diverting valves 87 for use when the system is generating power, may of course, be provided by those skilled in the art. In FIG. 6, the pressurized off-gas and steam from chamber 20 flowing through grid channel 68 and treatment section 78 are conducted through outlets 79 to the turbine 94, as is the gas flowing down through the downcomers 70.

Figure 4:
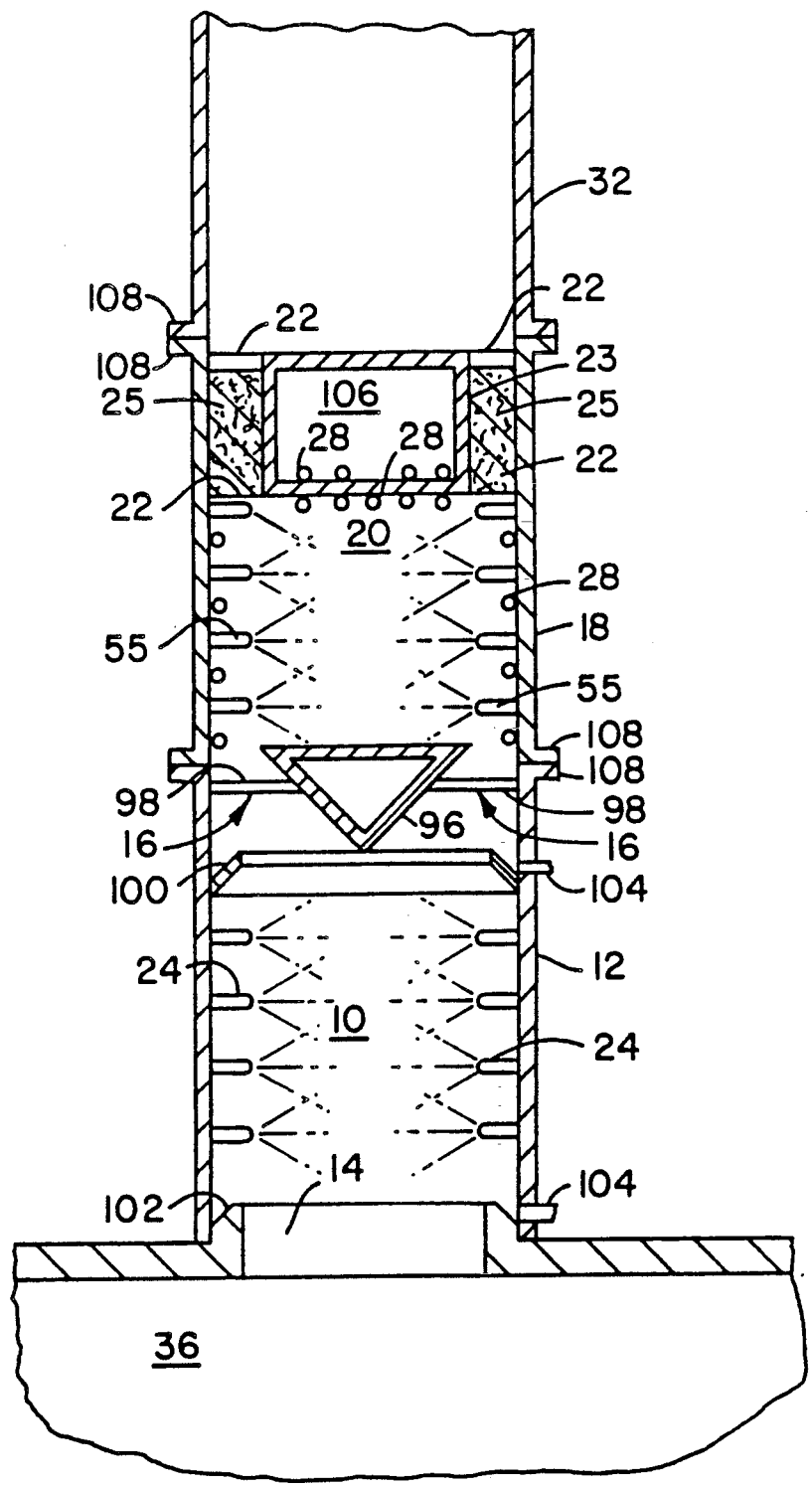
FIG. 4 is a longitudinal sectional view of a variation of the apparatus arrangement.
Figure 7:
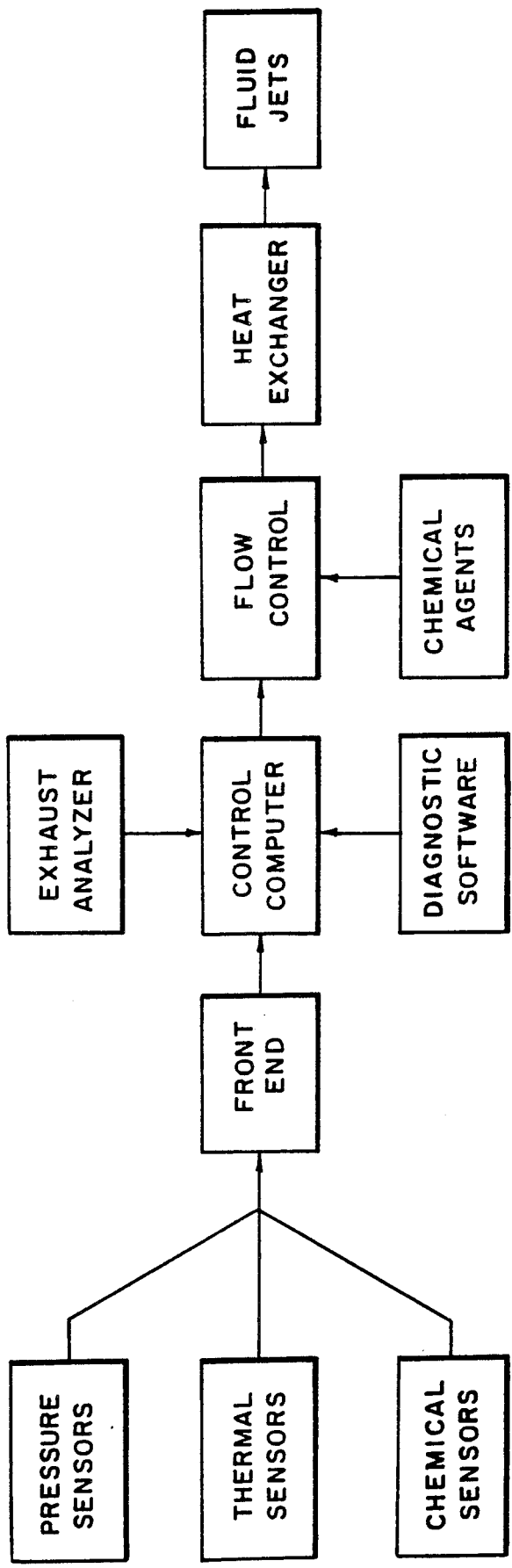
FIG. 7 is a schematic of an overall computer system for operating the various components of the apparatus.

The preferred apparatus arrangement is shown in FIGS. 1–3 wherein the configuration of the off-gas flow path is circuitous, however, the apparatus shown in FIG. 4 which is essentially vertical, can find application for certain installation in that it allows for stacking of chambers equivalent to 10 and 20 such that repetitive chemical scrubbing and kinetic energy reduction of the updrafted gas can be achieved without sacrificing significant building space such as adjoining rooms or buildings. In FIG. 4, structure equivalent to that shown in FIGS. 1–3 are numbered the same.

Referring to FIG. 4, a greatly simplified, but operable, embodiment of the invention is shown wherein the flow path of off-gas is substantially vertical and in the same general direction throughout. This embodiment utilizes the kinetic energy reduction effect as does the embodiment of FIGS. 1–3. In this embodiment the outlet 16 is defined by wall 12 and a central conical baffle 96 supported by a spider arrangement 98. This baffle assists in directing the chemically treated gases from 10 against the cooling coils 28 in chamber 20. Exhaust port means 22, of any number and size, provided through the top of cylinder 23 are preferably provided with filter means 25 such as any of those described above. Guttering such as 100 and 102 may be provided around the inside of any of walls 12, 18 or 32 and connected to suitable drains such as 104. The cooling means 28 may be positioned as shown or in any other arrangement which is effective, and the interior 106 of cylinder 23 may be in communication with coolant as described above. Also, the feed pipes for jets 24 and 55 may pass through cylinder 23 for pre-cooling of the chemical slurries or aqueous wash materials. The same or equivalent gas analysis probes, analyzers, computer, reactant reservoirs, chemical selecting means and the like described above are employed also with this embodiment. Baffle 96 provides a convenient site for the probes 56 and analyzer 58, however, as mentioned above, these items can be placed anywhere in the system and in any number. It is noted that the three wall sections 12, 18 and 32 are conveniently provided with bolt flanges such as 108 such that assembly and disassembly, or repetitive stacking of sections 12 and 18 are facilitated.

Referring to FIG. 5, the variation in reactor means comprises one or more continuous belts 82, e.g., each of a width of about two thirds the diameter of chamber 10, mounted on rollers 112 and 114, at least one of which rollers is driven, and comprised of a fine mesh 116 of high heat resistant material such as stainless steel wire mesh or ceramic coated steel wire mesh, a reactant chemical feed plenum 118, an aqueous wash device or plenum 120, and a catch trough 122. The top and bottom of the belt pass through snug fitting slots 124 and 126 respectively in the chamber wall 12. The feed plenum 118 is shown as having six separate chambers for six different chemicals. Each chamber is provided with an outlet 128 in the form of a slot or line of closely positioned apertures running substantially the width of the belt. Suitable solenoid or the like valves are provided for each outlet such that each chemical can be dispensed onto the belt selectively in accordance with the electrical signals received from control means 30. It is preferred that the belt be provided with a substrate material such as porous ceramic chips or the like to which the aqueous or other chemical feeds could cling or be adsorbed, or that the feed materials themselves be in the form of adhesive or semi-adhesive material or emulsion of innocuous chemical composition such that the retention thereof by the belt is enhanced. The porosity of the belt and any coating thereon should be sufficiently large to allow off-gas to readily pass therethrough and contact reactant chemical thereon. The aqueous wash device 120 having water pressure inlet 130 and wash jets 132 may be provided to remove chemicals from the belt at the end of their life cycle. Many useful variations of such continuous or semi-continuous belt type reactors will become apparent to those skilled in the art and are within the purview of the present invention.

This invention has been described in detail with particular reference to preferred embodiments thereof, but it will be understood that variations and modifications will be effected within the spirit and scope of the invention.

I claim:

1. An exhaust system adapted for the selective control of the types and concentrations of gaseous, ionic, colloidal or particulate matter emitted to the atmosphere in the off-gas of a combustion unit, said system comprising:
   (a) chemical treatment chamber means defined by
      (i) first wall means,
      (ii) off-gas inlet means in said first wall means, and
      (iii) outlet means in said first wall means providing exit means for chemically treated off-gas from said treatment chamber means;
   (b) second wall means defining off-gas, second chamber means communicating with said outlet means of said treatment chamber means and adapted to provide a reduced pressure off-gas region;
   (c) exhaust port means in said second wall means for exiting expanded off-gas;
   (d) reactor means communicating with said treatment chamber means and adapted to provide reactant chemicals in contact with the off-gas in said treatment chamber means;
   (e) reactant chemical selecting means associated with said reactor means and adapted for presenting different chemicals and concentrations thereof to said off-gas in said treatment chamber means;
   (f) cooling means for the off-gas in one or more selected portions of said exhaust system; and
   (g) control means communicating with the off-gas at one or more locations within said exhaust system for qualitatively and quantitatively analyzing the same and actuating said selecting means in relationship to said analysis to provide selected reactant chemicals in predetermined quantities to said reactor means for contact with said off-gas to selectively control the types and concentrations of said matter therein.

2. The system of claim 1 wherein said treatment chamber means is elongated and adapted for positioning above and in communication with the fire box of a combustion unit with its longitudinal axis oriented substantially vertically.

3. The system of claim 1 wherein said control means provides substantially continuous off-gas analysis and reactant chemical selection.

4. The system of claim 1 wherein said reactor means comprises multiple, pressurized fluid streams of different chemical compositions and ejector means therefor extending into said chamber means.

5. The system of claim 1 wherein cooling means is provided for maintaining said second chamber means at a reduced temperature.

6. The system of claim 2 wherein said second chamber means is positioned substantially vertically above said treatment chamber means.

7. The system of claim 1 wherein a common cooling means is provided for said reactor means and second chamber means.

8. The system of claim 7 wherein said common cooling means comprises heat exchanger means within said second chamber means or proximate thereto.

9. The system of claim 1 wherein said cooling means comprises the cooling coils of a refrigeration unit.

10. The system of claim 1 wherein said reactor means comprises variable reactant chemical bed means.

11. The system of claim 1 wherein slurry treatment means is provided communicating with said second chamber means for receiving slurry therefrom, said treatment means comprising channel means substantially vertically oriented and provided with baffle means for assisting in the size reduction of particulate matter during flow of the slurry downwardly in said channel means.

12. The system of claim 11 wherein said channel means substantially concentrically surrounds said first wall means.

13. The system of claim 12 wherein downcomer means is provided communicating with said second chamber means for exhausting the treated gasses therefrom.

14. The system of claim 13 wherein said gasses are fed from said downcomer means to power generating, turbine means.

15. The process for selectively controlling the concentration of one or more constituents in the off-gas of a combustion unit having a fire box and a flue system, comprising carrying out the following activities, in any order in a continuous or semi-continuous manner;
   (a) analyzing the chemical composition of the off-gas at one or more locations in said flue system,
   (b) directing the off-gas from the fire box into chemical treatment chamber means maintained at predesigned off-gas pressures,
   (c) contacting the off-gas in said treatment chamber means with reactant chemical means previously adjusted in reactivity and specificity according to the chemical analysis of the off-gas, for converting prescribed amounts of one or more of the constituents of said off-gas to one or more desired products,
   (d) exiting the treated off-gas from said treatment chamber means to second chamber means maintained at predesigned off-gas pressures lower than the off-gas pressures maintained in said treatment chamber means to effect a reduction in the kinetic energy of the treated off-gas and thus facilitate removal of particulate matter therefrom, and
   (e) exiting the reduced kinetic energy off-gas from said second chamber means to the atmosphere.

16. The process of claim 15 wherein the reduced kinetic energy off-gas is passed through filtering means for removing particulate matter therefrom prior to exiting to the atmosphere.

17. The process of claim 15 wherein said off-gas in said second chamber means is scrubbed with aqueous material to separate particulate matter therefrom.

18. The process of claim 15 wherein the temperature and kinetic energy of the off-gas in the treatment chamber means is further reduced by contact of the off-gas with heat exchanger means.

19. The process of claim 15 wherein said reactant chemical means comprises aqueous material containing at least one reactant chemical and is injected as a spray into said off-gas.

20. The process of claim 19 wherein said aqueous material is injected at temperatures less than about 40 F. into said off-gas.

21. The process of claim 15 wherein at least one point of analysis of the off-gas composition is proximate the atmospheric exit of said flue system.

* * * * *

UNITED STATES PATENT AND TRADEMARK OFFICE
CERTIFICATE OF CORRECTION

PATENT NO. : 5,103,742
DATED      : April 14, 1992
INVENTOR(S): Joseph V. Valentino It is certified that error appears in the above-indentified patent and that said Letters Patent is hereby corrected as shown below:

On title page, item [76], Inventor: "858 Xon Wood Park Dr.,"

should read --8 Saxon Wood Park Drive--

Signed and Sealed this

Twenty-sixth Day of October, 1993

Attest:

BRUCE LEHMAN

Attesting Officer — Commissioner of Patents and Trademarks